United States Patent
Zhang et al.

(10) Patent No.: US 12,252,444 B1
(45) Date of Patent: Mar. 18, 2025

(54) CRACK-RESISTANT ULTRA-HIGH PERFORMANCE CONCRETE FOR UNDERGROUND ENGINEERING IN WATER-RICH STRATA, PREPARATION METHOD, AND APPLICATION THEREOF

(71) Applicant: SHANDONG UNIVERSITY, Jinan (CN)

(72) Inventors: Fengling Zhang, Jinan (CN); Kai Pang, Jinan (CN); Xiangyu Meng, Jinan (CN); Jinglong Li, Jinan (CN); Jinghang Zhang, Jinan (CN); Yupeng Cui, Jinan (CN); Xiufang Zheng, Jinan (CN); Tongchun Su, Jinan (CN); Chenxu Yan, Jinan (CN); Min Tang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/944,099

(22) Filed: Nov. 12, 2024

(30) Foreign Application Priority Data

May 17, 2024 (CN) .......................... 202410614205.2

(51) Int. Cl.
*C04B 28/04* (2006.01)
*B28B 1/087* (2006.01)
(Continued)

(52) U.S. Cl.
CPC .............. *C04B 28/04* (2013.01); *C04B 14/28* (2013.01); *C04B 14/304* (2013.01);
(Continued)

(58) Field of Classification Search
CPC ....... C04B 28/04; C04B 14/28; C04B 14/304; C04B 14/365; C04B 18/027; C04B 18/08;
(Continued)

(56) References Cited

FOREIGN PATENT DOCUMENTS

| CN | 108929080 A | 12/2018 |
|---|---|---|
| CN | 110734257 A * | 1/2020 |

(Continued)

OTHER PUBLICATIONS

CN110734257A (transl. espacenet) (Year: 2020).*
CN110818339A (transl. espacenet) (Year: 2020).*
CN116903330A (transl. espacenet) (Year: 2023).*

*Primary Examiner* — Robert C Boyle
*Assistant Examiner* — Patrick Loen Benitez
(74) *Attorney, Agent, or Firm* — IPRO, PLLC

(57) ABSTRACT

The present invention discloses a crack-resistant ultra-high performance concrete (UHPC) for underground engineering in water-rich strata, preparation method, and application thereof, belonging to the technical field of building materials. The concrete is prepared from the following raw materials in parts by weight: 550-650 parts of cement, 140-180 parts of fly ash, 120-150 parts of silica fume, 200-300 parts of calcined shield tunnel slag, 30-50 parts of micron-scale magnesium oxide, 30-50 parts of nano-scale magnesium oxide, 30-50 parts of rheology-modifying material, 800-1000 parts of lightweight aggregate, 4-8 parts of water reducer, and 50-200 parts of water. The rheology-modifying material has a fluidity ratio of 106%. The present invention incorporates calcined shield tunnel slag, micron/nano-scale magnesium oxide, and lightweight aggregate into the UHPC, which effectively suppresses shrinkage and reduces crack formation.

9 Claims, 2 Drawing Sheets

(51) Int. Cl.
    *C04B 14/28*         (2006.01)
    *C04B 14/30*         (2006.01)
    *C04B 14/36*         (2006.01)
    *C04B 18/02*         (2006.01)
    *C04B 18/08*         (2006.01)
    *C04B 18/14*         (2006.01)
    *C04B 20/02*         (2006.01)
    *C04B 20/04*         (2006.01)
    *C04B 24/26*         (2006.01)
    *C04B 40/00*         (2006.01)
    *C04B 103/00*       (2006.01)
    *C04B 103/30*       (2006.01)
    *C04B 103/32*       (2006.01)
    *E21D 11/00*         (2006.01)
    *E21D 11/10*         (2006.01)

(52) U.S. Cl.
    CPC .......... *C04B 14/365* (2013.01); *C04B 18/027* (2013.01); *C04B 18/08* (2013.01); *C04B 18/141* (2013.01); *C04B 18/146* (2013.01); *C04B 20/026* (2013.01); *C04B 20/04* (2013.01); *C04B 24/2647* (2013.01); *C04B 40/0042* (2013.01); *C04B 40/0046* (2013.01); *E21D 11/10* (2013.01); *B28B 1/087* (2013.01); *C04B 2103/0079* (2013.01); *C04B 2103/302* (2013.01); *C04B 2103/32* (2013.01); *C04B 2201/52* (2013.01); *E21D 11/003* (2013.01)

(58) Field of Classification Search
    CPC ... C04B 18/141; C04B 18/146; C04B 20/026; C04B 20/04; C04B 24/2647; C04B 40/0042; C04B 40/0046; E21D 11/10
    See application file for complete search history.

(56) References Cited

FOREIGN PATENT DOCUMENTS

| | | | | |
|---|---|---|---|---|
| CN | 110818339 A | * | 2/2020 | ............ C04B 28/02 |
| CN | 112125603 A | | 12/2020 | |
| CN | 113321467 A | | 8/2021 | |
| CN | 115477521 A | | 12/2022 | |
| CN | 116903330 A | * | 10/2023 | |
| CN | 117401949 A | | 1/2024 | |
| CN | 117735917 A | | 3/2024 | |
| CN | 117756468 A | | 3/2024 | |
| CN | 117800632 A | | 4/2024 | |
| CN | 117843300 A | | 4/2024 | |

\* cited by examiner

CRACK-RESISTANT ULTRA-HIGH PERFORMANCE CONCRETE FOR UNDERGROUND ENGINEERING IN WATER-RICH STRATA, PREPARATION METHOD, AND APPLICATION THEREOF

CROSS-REFERENCE TO RELATED APPLICATIONS

The present invention claims priority to Chinese Patent Application No. CN 202410614205.2, filed on May 17, 2024, titled "CRACK-RESISTANT ULTRA-HIGH PERFORMANCE CONCRETE FOR UNDERGROUND ENGINEERING IN WATER-RICH STRATA, PREPARATION METHOD, AND APPLICATION THEREOF." The entire contents of the aforementioned application are incorporated herein by reference for all purposes.

FIELD OF THE INVENTION

The present invention pertains to the technical field of building materials, specifically relating to a crack-resistant ultra-high performance concrete (UHPC) for underground engineering in water-rich strata, preparation method, and application thereof.

BACKGROUND OF THE INVENTION

The disclosure of the background art section is merely intended to enhance the overall understanding of the invention and should not necessarily be considered as an acknowledgment or implied admission that the information constitutes prior art known to those of ordinary skill in the art.

In urban underground engineering in water-rich strata, ultra-high performance concrete (UHPC) has become the material of choice for design and construction due to its excellent mechanical properties and durability, which can effectively improve the service life and safety of underground projects. However, UHPC often faces cracking issues during practical application. This problem not only affects the overall performance of the structure but may also lead to water vapor infiltration, accelerating steel reinforcement corrosion, and in severe cases, threatening structural safety.

The causes of UHPC cracking include multiple factors: 1) UHPC typically employs a low water-to-cement ratio to achieve higher strength, resulting in limited free water content within the material. As the hydration process progresses, the amount of free water available for hydration further decreases, leading to the transformation of water in many capillaries from a saturated to an unsaturated state, generating negative pressure within the capillaries and causing shrinkage. 2) Some high-performance admixtures used in UHPC, while improving concrete performance, also promote self-shrinkage, thereby inducing cracks. 3) During the hardening process of UHPC, the cement hydration reaction releases a significant amount of heat, leading to a rapid rise in temperature, increased thermal shrinkage, and internal stress that exceeds the tensile strength of the concrete, resulting in cracks. 4) Inappropriate curing conditions can also exacerbate cracking risks, such as excessively high or low curing temperatures, improper humidity control.

To address the UHPC cracking issue, existing technologies often employ single control measures, such as optimizing the water-to-cement ratio, introducing retarders to control hydration heat, or using additives to control shrinkage. While these methods alleviate cracking to some extent, they often target only a single cause of cracking. In the complex and variable conditions of underground engineering in water-rich strata, the effectiveness of single measures is even more limited.

During urban underground engineering construction, the shield tunneling method is commonly used, generating a large amount of shield tunnel slag. How to reasonably utilize this shield tunnel slag, convert it into resources, and reduce environmental impact has also become an urgent problem to be solved.

SUMMARY OF THE INVENTION

To overcome the deficiencies of the prior art, the objective of the present invention is to provide a crack-resistant ultra-high performance concrete (UHPC) for underground engineering in water-rich strata, preparation method and application thereof. By replacing part of the cement with shield tunnel slag to regulate hydration heat, combining full-process shrinkage compensation with micron- and nano-scale magnesium oxide, internal curing with lightweight aggregate, and the application of a self-adhesive natural resin curing film, the present invention achieves dual crack control and internal-external curing of concrete, effectively enhancing the crack resistance of the concrete.

To achieve the above objective, the technical solutions of the present invention are as follows:

in a first aspect, the present invention provides a crack-resistant ultra-high performance concrete for underground engineering in water-rich strata, which is prepared from the following raw materials in parts by weight:

550-650 parts cement, 140-180 parts fly ash, 120-150 parts silica fume, 200-300 parts calcined shield tunnel slag, 30-50 parts micron-scale magnesium oxide, 30-50 parts nano-scale magnesium oxide, 30-50 parts rheology-modifying material, 800-1000 parts lightweight aggregate, 4-8 parts water reducer, and 50-200 parts water;

the fluidity ratio of the rheology-modifying material is 106%.

In a second aspect, the present invention provides a method for preparing the aforementioned crack-resistant ultra-high performance concrete for underground engineering in water-rich strata, comprising:

S1. mixing the cement, fly ash, silica fume, calcined shield tunnel slag, micron-scale magnesium oxide, nano-scale magnesium oxide, rheology-modifying material, and lightweight aggregate, followed by dry mixing at a low speed for 3-5 minutes to obtain a first mixture;

S2. dissolving the water reducer in water to form a mixed solution, adding 70% by weight of the mixed solution to the first mixture, and mixing at a medium speed for 3-5 minutes to obtain a second mixture;

S3. adding the remaining 30% by weight of the mixed solution to the second mixture, and mixing at a high speed for 3-5 minutes to obtain a mixed slurry;

S4. pouring the mixed slurry into molds, vibrating for 1-2 minutes, covering the surface of the mixed slurry with a film, after casting, demolding the film after 24 hours to obtain concrete, and covering the surface of the concrete with a curing film to continue curing until a specified time.

Optionally, the curing film used after demolding in S4 is a curing film with a water-blocking layer on the outside.

In a third aspect, the present invention provides an application of the aforementioned crack-resistant ultra-high performance concrete for underground engineering in water-rich strata and/or the aforementioned method in constructing the main structure of underground rail transit stations, tunnel lining structures, or water diversion tunnels in hydraulic engineering.

Advantages of the present invention
1. In the present invention, the incorporation of calcined shield tunnel slag, micron/nano-scale magnesium oxide, and lightweight aggregate into the ultra-high performance concrete effectively suppresses the shrinkage of the ultra-high performance concrete. Calcined shield tunnel slag, as a substitute for cement, can reduce hydration heat, thereby avoiding cracks caused by thermal stress. Micron-scale and nano-scale magnesium oxide, due to their different particle sizes and surface areas, exhibit different hydration rates and degrees of reaction. Nano-scale magnesium oxide hydrates quickly, providing a volumetric expansion effect in the early stages of concrete curing, while micron-scale magnesium oxide hydrates slowly, providing a volumetric expansion effect in the later stages, thus offering full-process shrinkage compensation and reducing the occurrence of cracks. The lightweight aggregate also provides internal curing, slowing moisture evaporation and preventing surface cracking.
2. The method of the present invention uses a curing film with water-blocking functionality as an external curing measure. This not only effectively locks in the moisture evaporated from the concrete surface but also gradually releases the locked moisture through the microstructure of the material to achieve a rehydration effect. This, in combination with internal curing, maximizes the curing effect of the concrete.
3. The present invention provides an integrated strategy of "dual control-internal and external curing," which combines the hydration heat regulation mechanism of calcined shield tunnel slag with the shrinkage compensation regulation mechanism of micron- and nano-scale magnesium oxide. On the other hand, it synergizes the internal moist curing effect of lightweight aggregates with the external curing provided by a self-adhesive natural resin curing film, forming an innovative internal-external curing system for concrete, thereby comprehensively optimizing concrete performance. As a result, the ultra-high strength concrete can be applied to underground engineering in water-rich strata.
4. In the present invention, the calcined shield tunnel slag is derived from shield tunnel slag, which is a large quantity of engineering waste generated in underground engineering. The present invention not only addresses the environmental pollution problem caused by engineering waste but also converts it into valuable building materials for reuse in underground engineering, solving the problem of solid waste utilization and achieving in-situ consumption and resource utilization of waste.

BRIEF DESCRIPTION OF DRAWINGS

The accompanying drawings to the specification, which form part of the present invention, are used to provide a further understanding of the present invention, and the illustrative examples of the present invention and the description thereof are used to explain the present invention and are not unduly limiting the present invention.

DETAILED DESCRIPTION OF THE INVENTION

It should be noted that the following detailed descriptions are all illustrative and intended to provide further clarification of the present invention. Unless otherwise specified, all technical and scientific terms used herein have the same meaning as commonly understood by one of ordinary skill in the art to which this invention belongs.

It should be noted that the terminology used here is for the purpose of describing particular embodiments only and is not intended to be limiting of the exemplary embodiments of the invention. As used herein, the singular form is intended to include the plural form as well, unless the context clearly indicates otherwise, and it should also be understood that when the terms "comprising" and/or "including" are used in this specification, they indicate the presence of features, steps, operations, devices, components, and/or combinations thereof.

A typical embodiment of the present invention provides a crack-resistant ultra-high performance concrete for underground engineering in water-rich strata, which is prepared from the following raw materials in parts by weight:

550-650 parts cement, 140-180 parts fly ash, 120-150 parts silica fume, 200-300 parts calcined shield tunnel slag, 30-50 parts micron-scale magnesium oxide, 30-50 parts nano-scale magnesium oxide, 30-50 parts rheology-modifying material, 800-1000 parts lightweight aggregate, 4-8 parts water reducer, and 50-200 parts water;

the fluidity ratio of the rheology-modifying material is 106%.

Figure 1:
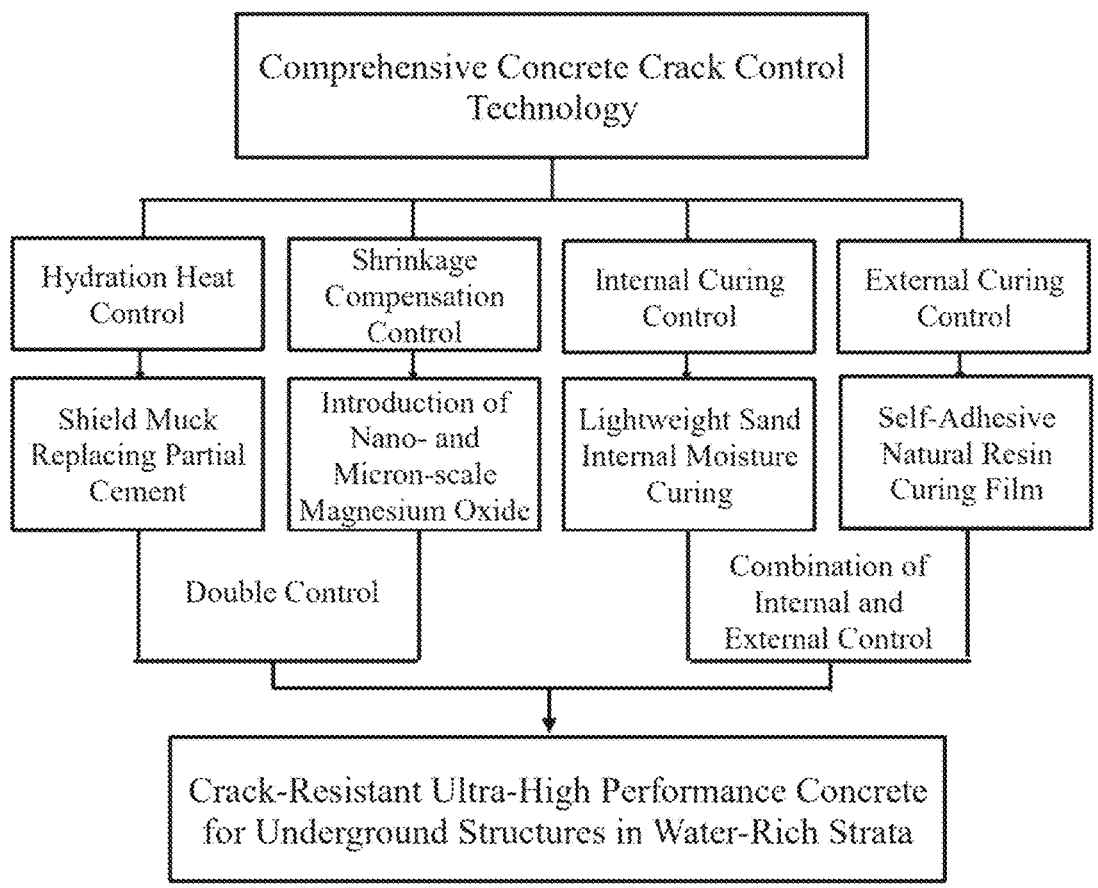
FIG. 1 is a schematic diagram of a technical route in a specific embodiment of the present invention.

With the above setup, the shrinkage cracks in the ultra-high performance concrete can be effectively suppressed. As shown in FIG. 1, calcined shield tunnel slag, as a substitute material for cement, can reduce hydration heat and prevent cracks caused by thermal stress. Micron-scale and nano-scale magnesium oxide, due to their different particle sizes and surface areas, exhibit different hydration rates and degrees of reaction. Nano-scale magnesium oxide hydrates quickly, providing a volumetric expansion effect in the early stages of concrete curing, while micron-scale magnesium oxide hydrates more slowly, offering a volume expansion effect in the later stages. This provides full-process shrinkage compensation, reducing the occurrence of cracks. Lightweight aggregates also provide internal curing, slowing moisture evaporation and preventing surface cracking.

Optionally, the cement is 52.5 or 52.5R grade ordinary Portland cement, which has good compatibility with polycarboxylate-based water reducers.

Optionally, the fly ash is grade I fly ash, with a loss on ignition of less than 3.0% and a specific surface area greater than 1000 $cm^2/g$. Its main components are silicon dioxide and aluminum oxide, which have high hardness and can enhance strength.

Optionally, the silica fume had a silicon dioxide content of no less than 97%, a pozzolanic activity index of over 95%, a specific surface area of more than 21.0 $m^2/g$, and a density of 2.20 $g/cm^3$.

Optionally, the calcined shield tunnel slag is produced by first allowing the shield tunnel slag to air-dry, then grinding the material with a ball mill for 20-30 minutes, followed by calcination at a temperature exceeding 800° C. This process results in a yellow-brown powder with a particle size of less than 100 μm. The shield tunnel slag used in the present invention comes from solid waste generated during urban subway construction, with the main components being silicon dioxide and aluminum oxide. After appropriate treatment, the shield tunnel slag can exhibit cementitious properties, allowing the material to function as a substitute for cement in binding applications. The reactivity of the shield tunnel slag is typically lower than that of ordinary Portland cement, which leads to reduced heat release during the hydration process. This reduction in heat generation helps manage temperature increases in large-volume concrete and minimizes the heat of hydration.

Optionally, a particle size of the micron-scale magnesium oxide is 5-10 μm, and a specific surface area of the micron-scale magnesium oxide is 0.16-0.34 $m^2/g$.

Optionally, a particle size of the nano-scale magnesium oxide is 100-500 nm, and a specific surface area of the nano-scale magnesium oxide is 3.36-16.8 $m^2/g$.

Optionally, the rheology-modifying material, also known as rheology modifiers, are functional materials composed of special powder particles. In a specific embodiment of the present invention, the rheology modifiers are commercially available and can be substituted with other materials. The composition generally includes 15% silica fume, 15% fly ash, 60% limestone powder, 3% calcium sulfate, and 7% nano-modified particles. These modifiers serve to improve the fluidity of the mixture, enhance its pumpability and workability, with a fluidity ratio of 106%.

The fluidity ratio is calculated as the ratio of the fluidity of concrete with added rheology-modifying material added in proportion to the fluidity of concrete with the same components but without rheology-modifying material.

Optionally, a particle size of the lightweight aggregate is less than 5 mm, with a bulk density of less than 1200 $kg/m^3$. The particle size distribution meets the technical requirements of "Technical Requirements for Ultra-High Performance Concrete (UHPC) (T/CECS 10107-2020)", with a water absorption rate of 15-25% and a porosity of 10-20%.

Optionally, the water reducer is a polycarboxylate superplasticizer, with a solid content greater than 20%, a pH value of around 7.5, and a water reduction rate of over 30%.

The method for preparing the aforementioned crack-resistant ultra-high performance concrete for underground engineering in water-rich strata comprises the following steps:
S1. mixing the cement, fly ash, silica fume, calcined shield tunnel slag, micron-scale magnesium oxide, nano-scale magnesium oxide, rheology-modifying material, and lightweight aggregate, followed by dry mixing at a low speed for 3-5 minutes to obtain a first mixture;
S2. dissolving the water reducer in water to form a mixed solution, adding 70% by weight of the mixed solution to the first mixture, and mixing at a medium speed for 3-5 minutes to obtain a second mixture;
S3. adding the remaining 30% by weight of the mixed solution to the second mixture, and mixing at a high speed for 3-5 minutes to obtain a mixed slurry;
S4. pouring the mixed slurry into molds, vibrating for 1-2 minutes, covering the surface of the mixed slurry with a film, after casting, demolding the film after 24 hours to obtain concrete, and covering the surface of the concrete with a curing film to continue curing until a specified time.

Optionally, the low speed refers to a mixer speed of 45 r/min, the medium speed refers to a mixer speed of 90 r/min, and the high speed refers to a mixer speed of 150 r/min.

Optionally, the curing film used after demolding in S4 is a curing film with a water-blocking layer on the outside, specifically a self-adhesive natural resin curing film. The main body is composed of a honeycomb natural resin layer, with the inner surface in contact with the concrete having matrix-arranged self-adhesive materials, and the outer surface covered with a water-blocking membrane. The curing film with water-blocking properties acts as an external curing measure, effectively locking in moisture on the surface of the concrete while gradually releasing water through the microporous structure of the material to achieve a rehydration effect. This, combined with internal curing, maximizes the curing effect of the concrete.

Optionally, in S4, the curing process adopts standard curing conditions, including a temperature of 20±2° C. and a relative humidity of >95% RH.

An application of the aforementioned crack-resistant ultra-high performance concrete for underground engineering in water-rich strata and the aforementioned methods are applied in underground engineering in water-rich strata, including applications such as constructing the main structure of underground rail transit stations, tunnel lining structures, or water diversion tunnels in hydraulic engineering.

Due to the high moisture content in water-rich strata, water easily penetrates through surface cracks in concrete components, not only corroding the concrete matrix but also corroding exposed internal steel reinforcements. Therefore, crack control for concrete components used in water-rich strata is highly stringent. Through the specified concrete composition and curing method, the present invention significantly reduces the number of cracks in ultra-high strength concrete, making it suitable for application in underground engineering in water-rich strata.

Example 1

This example provided a crack-resistant ultra-high performance concrete for underground engineering in water-rich strata, which was prepared from the following raw materials in parts by weight:

560 parts of cement, 160 parts of fly ash, 130 parts of silica fume, 260 parts of calcined shield tunnel slag, 45 parts of micron-scale magnesium oxide, 45 parts of nano-scale magnesium oxide, 45 parts of rheology modifiers, 950 parts of lightweight aggregate, 4.5 parts of water reducer, and 162 parts of water.

The cement used was 52.5 or 52.5R grade ordinary Portland cement.

The fly ash was grade I, with a loss on ignition less than 3.0% and a specific surface area greater than 1000 $cm^2/g$.

The silica fume had a silicon dioxide content of no less than 97%, a pozzolanic activity index of over 95%, a specific surface area of more than 21.0 $m^2/g$, and a density of 2.20 $g/cm^3$.

The calcined shield tunnel slag was air-dried, then ground for 20-30 minutes using a ball mill, followed by calcination at temperatures above 800° C. to produce a yellow-brown powder with a silicon dioxide content of 78.9% and a particle size of less than 0.075 mm.

The particle size of the micron-scale magnesium oxide ranged around 6 μm, and the particle size of the nano-scale magnesium oxide was around 400 nm.

The rheology modifiers were commercially available, and composed of the following raw materials in approximately the following mass proportions: 15% silica fume, 15% fly ash, 60% limestone powder, 3% calcium sulfate, and 7% nano-modified particles, with a fluidity ratio of 106%.

The lightweight aggregate had a particle size of less than 5 mm and a bulk density of less than 1200 kg/m$^3$.

The water reducer was a polycarboxylate superplasticizer, with a water reduction rate of over 30%.

The preparation method for the ultra-high performance concrete for underground engineering in water-rich strata in this example included the following steps:

S1. 560 parts of cement, 160 parts of fly ash, 130 parts of silica fume, 260 parts of calcined shield tunnel slag, 45 parts of micron-scale magnesium oxide, 45 parts of nano-scale magnesium oxide, 45 parts of rheology modifiers, and 950 parts of lightweight aggregate were mixed and placed into a mixer. The mixer operated at a low speed of 45 r/min for 3-5 minutes to dry mix the ingredients until well-mixed, obtaining a first mixture.

S2. 4.5 parts of water reducer were dissolved in 162 parts of water to form a mixed solution. 70% by weight of the mixed solution (approximately 116.6 parts) was added to the mixer containing the first mixture, and the mixer was operated at a medium speed of 90 r/min for 3-5 minutes until well-mixed, obtaining a second mixture.

S3. The remaining 30% by weight of the mixed solution (approximately 49.9 parts) was added to the mixer containing the second mixture, and the mixer was operated at a high speed of 150 r/min for 3-5 minutes until well-mixed, obtaining a mixed slurry.

S4. The mixed slurry obtained in S3 was poured into molds and vibrated on a vibrating table for 1-2 minutes. After casting, a plastic film was applied to the surface to prevent moisture loss. The concrete was demolded after 24 hours, and a self-adhesive natural resin curing film was applied to the surface of the demolded concrete, ensuring no bubbles and wrinkles during application. The concrete, covered with the self-adhesive natural resin curing film, was further cured at a temperature of 20±2° C. until the specified time.

Example 2

This example provided a crack-resistant ultra-high performance concrete for underground engineering in water-rich strata, which was prepared from the following raw materials in parts by weight:

650 parts of cement, 160 parts of fly ash, 140 parts of silica fume, 210 parts of calcined shield tunnel slag, 35 parts of micron-scale magnesium oxide, 35 parts of nano-scale magnesium oxide, 45 parts of rheology modifiers, 830 parts of lightweight aggregate, 4.5 parts of water reducer, and 175 parts of water.

The raw material requirements and preparation method were the same as in Example 1.

Example 3

This example provided a crack-resistant ultra-high performance concrete for underground engineering in water-rich strata, which was prepared from the following raw materials in parts by weight:

550 parts of cement, 140 parts of fly ash, 150 parts of silica fume, 300 parts of calcined shield tunnel slag, 50 parts of micron-scale magnesium oxide, 50 parts of nano-scale magnesium oxide, 30 parts of rheology modifiers, 1000 parts of lightweight aggregate, 8 parts of water reducer, and 50 parts of water.

The raw material requirements and preparation method were the same as in Example 1.

Example 4

This example provided a crack-resistant ultra-high performance concrete for underground engineering in water-rich strata, which was prepared from the following raw materials in parts by weight:

600 parts of cement, 180 parts of fly ash, 150 parts of silica fume, 200 parts of calcined shield tunnel slag, 30 parts of micron-scale magnesium oxide, 30 parts of nano-scale magnesium oxide, 50 parts of rheology modifiers, 900 parts of lightweight aggregate, 4 parts of water reducer, and 200 parts of water.

The raw material requirements and preparation method were the same as in Example 1.

Comparative Example 1

The ultra-high performance concrete in this comparative example was prepared from the following raw materials in parts by weight:

800 parts of cement, 180 parts of fly ash, 150 parts of silica fume, 45 parts of rheology modifiers, 830 parts of quartz sand, 4.5 parts of water reducer, and 170 parts of water.

The quartz sand was fine aggregate, meeting the requirements of "Technical Requirements for Ultra-High Performance Concrete (UHPC) (T/CECS 10107-2020)", with a particle size of 3-5 mm, and did not possess water absorption and retention capacity.

In the preparation process, no self-adhesive natural resin curing film was applied during the curing process after demolding.

The requirements for other raw materials and the preparation method were the same as in Example 1.

Comparative Example 2

The difference between Comparative Example 2 and Comparative Example 1 is that 200 parts of calcined shield tunnel slag were used to replace an equal weight of cement. The other raw materials and the preparation method were the same as in Comparative Example 1.

Comparative Example 3

The difference between Comparative Example 3 and Comparative Example 1 is that 45 parts of micron-scale magnesium oxide and 45 parts of nano-scale magnesium oxide were added. The other raw materials and the preparation method were the same as in Comparative Example 1.

Comparative Example 4

The difference between Comparative Example 4 and Comparative Example 1 is that the quartz sand was replaced with lightweight aggregate from Example 1, with the same weight as the quartz sand. The other raw materials and the preparation method were the same as in Comparative Example 1.

Comparative Example 5

The difference between Comparative Example 5 and Comparative Example 1 is that in the preparation process, the surface of the specimen was covered with a self-adhesive natural resin curing film after demolding. The other raw materials and the preparation method were the same as in Comparative Example 1.

Performance Testing

Specimens with dimensions of 40×40×40 mm³ were prepared from each of the examples and comparative examples.

During the preparation process, the slump-flow of each example and comparative example was tested.

The compressive strength of the specimens was tested after the specimens were cured with the self-adhesive natural resin curing film until the specified time.

The number of cracks on all surfaces of the specimens was detected 24 hours after water was added, using the flat plate method. The crack area was calculated based on the length and width of the cracks, and the ratio of the crack area to the surface area of the specimen was determined.

According to "Standard for test methods of long-term performance and durability of ordinary concrete (GB/T 50082-2009)", the water impermeability test was used to evaluate the impermeability grade.

The performance test results are shown in Table 1.

in Comparative Example 1, indicating significant improvements in waterproof performance in Examples compared with Comparative Examples. This makes the concrete suitable for structural components in underground engineering in water-rich strata, resisting erosion caused by high moisture content in such environments.

The use of calcined shield tunnel slag not only solved the issue of disposing of large amounts of construction waste but also replaced part of the cement, reducing the heat of hydration, which played a crucial role in controlling the self-shrinkage and thermal stress cracking of UHPC. By calcining the shield tunnel slag at 800° C., its reactivity was enhanced, further optimizing the microstructure and cementitious properties of the concrete. The introduction of magnesium oxide, particularly the combination of different particle sizes, provided full-cycle shrinkage compensation for the concrete, effectively controlling crack formation and propagation. The application of lightweight aggregate provided UHPC with necessary internal curing conditions, reducing rapid moisture evaporation and maintaining internal humidity and temperature, thereby further ensuring the performance of the concrete.

TABLE 1

| | Slump-flow (mm) | Compressive Strength (MPa) | | | Average Crack Area per Crack (mm²/crack) | Number of Cracks per Unit Area (cracks/m²) | Total Crack Area per Unit Area (mm²/m²) | Impermeability Grade |
| --- | --- | --- | --- | --- | --- | --- | --- | --- |
| | | 3 days | 7 days | 28 days | | | | |
| Example 1 | 280 | 68.9 | 90.5 | 137.9 | 27 | 8.3 | 224 | >12 |
| Example 2 | 270 | 65.4 | 85.3 | 131.2 | 46 | 10.4 | 478.4 | >12 |
| Example 3 | 260 | 66.7 | 87.8 | 135.4 | 37 | 9.6 | 355.2 | >12 |
| Example 4 | 285 | 72.3 | 94.5 | 140.3 | 53 | 10.2 | 540.6 | >12 |
| Comparative Example 1 | 310 | 66.7 | 84.4 | 123.6 | 87 | 15.1 | 1322.4 | >10 |
| Comparative Example 2 | 285 | 64.3 | 81.7 | 120.8 | 64 | 13.3 | 851.2 | >10 |
| Comparative Example 3 | 265 | 66.3 | 83.4 | 122.7 | 57 | 11.7 | 666.9 | >10 |
| Comparative Example 4 | 300 | 65.7 | 82.1 | 121.7 | 68 | 14.2 | 965.6 | >10 |
| Comparative Example 5 | 310 | 66.5 | 84.1 | 122.9 | 55 | 11.6 | 638 | >10 |

Examples 1 to 4, particularly Examples 1 and 2, demonstrated significant performance improvements. These improvements were reflected in higher compressive strength, fewer cracks and smaller crack areas, and better impermeability ratings.

Specifically, the compressive strength of the specimens in Example 1 at 3, 7, and 28 days was higher than that of Comparative Example 1, showing rapid early strength development and higher final strength.

Figure 2:
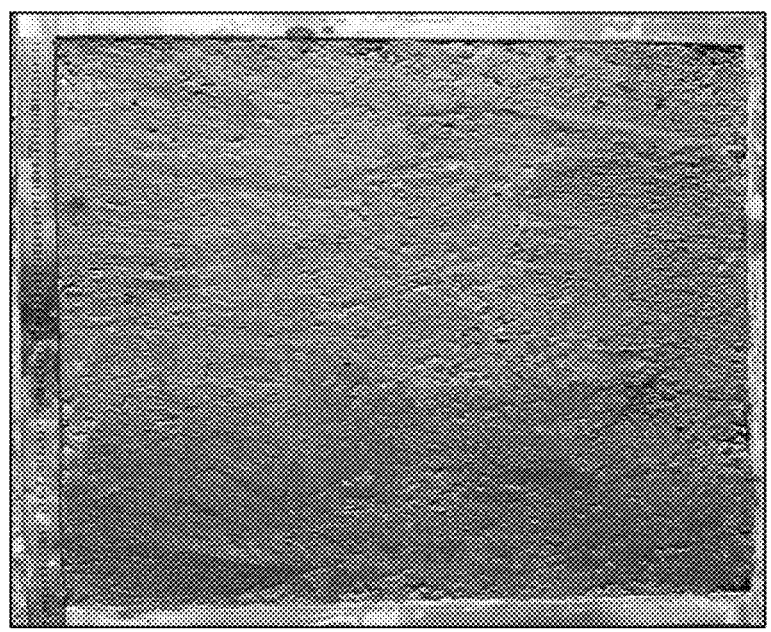
FIG. 2 is an illustration of early crack resistance samples of ultra-high performance concrete in Example 1 of a specific embodiment of the present invention.

The number of cracks per unit area and the total cracking area in Examples 1 and 2 were significantly lower than in Comparative Example 1. In particular, compared to Comparative Example 1, the average crack area per crack in Example 1 decreased from 87 mm²/crack to 27 mm²/crack, a reduction of 68%, and the number of cracks per unit area decreased from 15.1 cracks/m² to 8.3 cracks/m². The total cracking area per unit area was reduced by 83.1%. The early crack resistance test for the specimens in Example 1 is shown in FIG. 2, indicating that the concrete of the present invention performed exceptionally well in reducing crack formation.

The reduction in cracks resulted in increased strength and improved waterproof performance. The impermeability ratings of the concrete in Examples 1 and 2 were higher than In summary, the present invention provides a crack-resistant ultra-high performance concrete (UHPC) with excellent crack resistance, making it suitable for underground engineering in water-rich strata. It not only surpasses the existing ordinary ultra-high performance concrete in crack resistance, strength and durability, but also makes breakthroughs in environmental protection and resource utilization, providing a new solution for the research and application of underground engineering materials in water-rich strata. By comparing the Example with Comparative Example, the present invention obviously optimized the structural performance of UHPC, reduced the occurrence of cracks, and improved the impermeability of the structure, which fully proved the effectiveness and innovation of the proposed method.

The above descriptions are merely preferred embodiments of the present invention and are not intended to limit the present invention. For those skilled in the art, various changes and modifications can be made to the present invention. Any modification, equivalent replacement, or improvement made within the spirit and principles of the present invention should be included within the scope of the present invention's protection.

The invention claimed is:

1. A crack-resistant ultra-high performance concrete for underground engineering in water-rich strata, being prepared from the following raw materials in parts by weight: 550-650 parts of cement, 140-180 parts of fly ash, 120-150 parts of silica fume, 200-300 parts of calcined shield tunnel slag, 30-50 parts of micron-scale magnesium oxide, 30-50 parts of nano-scale magnesium oxide, 30-50 parts of rheology-modifying material, 800-1000 parts of lightweight aggregate, 4-8 parts of water reducer, and 50-200 parts of water;

a fluidity ratio of the rheology-modifying material is 106%;

the lightweight aggregate with a particle size of less than 5 mm, a bulk density of less than 1200 kg/m$^3$, a water absorption rate of 15-25%, and a porosity of 10-20%.

2. The crack-resistant ultra-high performance concrete for underground engineering in water-rich strata according to claim 1, wherein the cement is ordinary Portland cement of 52.5 or 52.5R grade.

3. The crack-resistant ultra-high performance concrete for underground engineering in water-rich strata according to claim 1, wherein the fly ash is grade I fly ash, with a loss on ignition of less than 3.0% and a specific surface area greater than 1000 cm$^2$/g; the silica fume has a silicon dioxide content of not less than 97%, a pozzolanic activity index greater than 95%, a specific surface area greater than 21.0 m$^2$/g, and a density of 2.20 g/cm$^3$; the calcined shield tunnel slag is obtained by air-drying shield tunnel slag, grinding for 20-30 minutes using a ball mill, and then calcining at a temperature above 800° C. to produce a yellow-brown powder with a particle size of less than 100 μm.

4. The crack-resistant ultra-high performance concrete for underground engineering in water-rich strata according to claim 1, wherein a particle size of the micron-scale magnesium oxide is 5-10 μm;

a particle size of the nano-scale magnesium oxide is 100-500 nm.

5. The crack-resistant ultra-high performance concrete for underground engineering in water-rich strata according to claim 1, wherein the rheology-modifying material comprises, by mass percentage: 15% silica fume, 15% fly ash, 60% limestone powder, 3% calcium sulfate, and 7% nano-modified particles.

6. The crack-resistant ultra-high performance concrete for underground engineering in water-rich strata according to claim 1, wherein the water reducer is a polycarboxylate superplasticizer.

7. The crack-resistant ultra-high performance concrete for underground engineering in water-rich strata according to claim 1, wherein being prepared from the following raw materials in parts by weight:

560 parts of cement, 160 parts of fly ash, 130 parts of silica fume, 260 parts of calcined shield tunnel slag, 45 parts of micron-scale magnesium oxide, 45 parts of nano-scale magnesium oxide, 45 parts of rheology-modifying material, 950 parts of lightweight aggregate, 4.5 parts of water reducer, and 162 parts of water.

8. A method for preparing a crack-resistant ultra-high performance concrete for underground engineering in water-rich strata according to claim 1, comprising:

S1: mixing cement, fly ash, silica fume, calcined shield tunnel slag, micron-scale magnesium oxide, nano-scale magnesium oxide, rheology-modifying material, and lightweight aggregate, followed by dry mixing at 45 r/min for 3-5 minutes to obtain a first mixture;

S2: dissolving a water reducer in water to form a mixed solution, adding 70% by weight of the mixed solution to the first mixture, and mixing at 90 r/min for 3-5 minutes to obtain a second mixture;

S3: adding the remaining 30% by weight of the mixed solution to the second mixture, and mixing at 150 r/min for 3-5 minutes to obtain a mixed slurry;

S4: pouring the mixed slurry into molds, vibrating for 1-2 minutes, covering a surface of the mixed slurry with a film, after casting, demolding the film after 24 hours to obtain concrete, and covering a surface of the concrete with a curing film to continue curing until a specified time.

9. The method according to claim 8, wherein, in step S4, the curing film used after demolding is the curing film with a water-blocking layer on the outside, with a honeycomb natural resin layer as a main body, an inner surface of the curing film, which is in contact with the concrete, is provided with a matrix-arranged self-adhesive material, and an outer surface of the curing film is provided with a water-blocking membrane, which is equipped with micropores.

* * * * *